United States Patent [19]
Lorenz

[11] Patent Number: 5,952,081
[45] Date of Patent: Sep. 14, 1999

[54] PANE WITH SEASONALLY ADAPTED SOLAR RADIATION TRANSMISSION

[76] Inventor: Werner Lorenz, Ketteltasches Hof 12, 45289 Essen, Germany

[21] Appl. No.: 08/941,986

[22] Filed: Oct. 1, 1997

[51] Int. Cl.[6] ............................................ B32B 3/28
[52] U.S. Cl. ............................ 428/167; 428/156; 428/913
[58] Field of Search ............................. 428/34, 167, 156, 428/409, 543, 913

[56] References Cited

U.S. PATENT DOCUMENTS

| | | | |
|---|---|---|---|
| 2,071,411 | 2/1937 | Lamesch | 428/167 |
| 4,127,693 | 11/1978 | Lemelson | 428/163 |
| 4,542,449 | 9/1985 | Whitehead | 362/330 |
| 5,409,416 | 4/1995 | Eichhorn et al. | 428/167 |

*Primary Examiner*—Donald Loney

[57] ABSTRACT

A pane of transparent material exhibiting a plane base pane and an integrated structure of parallel ribs with triangular cross-section and corresponding grooves is described which rejects direct solar radiation during a summer season and transmits direct solar radiation during a winter season. The pane can be adapted to a wide range of facade directions and geographic latitudes and the duration of the light rejection season or the light transmission season, respectively, can be adapted to individual preferences by aligning the longitudinal axes of the ribs with reference to the horizontal line and by forming the triangular cross-section in an adequate way. A part of the solar radiation transmitted by the pane has horizontal and upward directions and, therefore, the pane provides pleasant daylight in rooms. The pane is able to replace venetian blinds or other movable protection systems and may avoid overheating of facade walls equipped with transparent insulation. In comparison to common double-panes the pane may save heating energy, cooling energy and/or, respectively, electrical energy for room illumination.

6 Claims, 8 Drawing Sheets

PANE WITH SEASONALLY ADAPTED SOLAR RADIATION TRANSMISSION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE INVENTION

Not Applicable

BACKGROUND OF THE INVENTION

Generally, window panes protect the interior of rooms from influences of the variable external atmosphere, e.g. from seasonal varying temperatures, emissions of noise, exhaust gas and dust and, moreover, are expected to transmit a sufficient amount of daylight for an adequate room illumination. With the daylight—consisting of direct and diffuse solar radiation—energy penetrates the windows which contributes to the heating of the interior of rooms. In winter this heat gain—as far as glare can be avoided or is experienced as non-disturbing, respectively,—generally is desirable, whereas in summer the heating of rooms by solar irradiation generally is undesirable.

The glazing of openings in buildings is commonly performed by isolating glass panes consisting of two or more plane sheets of glass which influence the thermal balance and, hence, the interior climate of the buildings. Isolating glass panes essentially transmit direct and diffuse solar light in order to provide luminous room interiors during daytime. In order to limit the heat flow into rooms caused by solar irradiation, the transmittance of isolating glass panes is reduced by providing a reflective layer on one face of a glass sheet. By this means, however, the illumination of the rooms is reduced, too.

A non-movable, vertical pane based on the optical properties of prisms is known which rejects the direct solar radiation in summer and reasonably transmits the direct solar radiation in winter (French patent application no. 8017364 from 1980, publication no. 2463254). A sheet of transparent material with a prismatic structure consisting of horizontal ribs and grooves of triangular cross-section pointing away from the building is employed. The function of this prismatic pane bases upon the total internal reflection of direct solar radiation occuring at the plane face pointing to the building for solar altitudes above a certain limiting angle. An equation is presented which relates the the limiting angle of the solar altitude, the critical angle of incidence at which a ray impinging internally on the plane face is just totally reflected and the angle between the upper surface of the prismatic rib and the vertical with each other. Prismatic panes of this kind have the disadvantage that they provide the intended total rejection of direct sunlight only for orientations of the pane narrow to the south and only for a limited time period during summer. These limitations are deemed to be the essential reasons for the fact that this prismatic pane is scarcely applied in practice.

Another pane is known which is suitable as an optical component for use in glazing (international patent application no. PCT/GB94/00949 from 1994, international publication no. WO94/25792). It comprises two transparent, substantially plane elements each having a plurality of horizontal grooves of adequately shaped cross-sections. This invention intends to provide an optical component which enhances the illumination by daylight within a building interior and nevertheless allows an almost normal, undistorted view from inside a building through the window. Although one embodiment of this invention is designed for protecting against direct solar irradiation, this invention obviously cannot simultaneously solve the main tasks mentioned above and provide protection against solar heat flow into rooms. The influence of different window orientations is not taken into account.

BRIEF SUMMARY OF THE INVENTION

The primary object of the invention is to specify a glazing for mainly vertical windows and facades for facade directions essentially deviating from the south which does not transmit direct solar radiation during a time period in summer, the length of which may be chosen due to individual requirements, which changes its transmittance from zero to as near as possible to 1—or vice versa—during periods in spring and autumn and which transmits direct solar radiation during the remaining period in winter to a high extent.

Secondary object of the invention is to specify a window and facade glazing which—all over the year—avoids glare caused by direct solar irradiation and which provides pleasant daylighting—in particular for the deeper parts of rooms.

Tertiary object of the invention is to specify a window and facade glazing which saves energy with reference to heating, cooling and illumination requirements.

The present invention describes a window and facade pane which—for a wide range of directions—is capable of protecting against glare and heat input from direct solar radiation and of providing improved daylighting and, hence, is able to save heating energy in winter, cooling energy in summer and electrical illumination energy all over the year.

The essential part of the window and facade pane is a sheet of transparent material with a prismatic structure consisting of ribs and grooves of triangular cross-section inclined by a certain angle to the horizontal line and pointing away from the building. The horizontal inclination of the ribs is mainly determined by the direction of the facade. The angles of the cross-section of the ribs are mainly determined by the direction of the facade and by the chosen length of the period in summer during which the direct solar radiation is not to penetrate the pane (for short: light rejection period). Depending on the deviation of the direction of the facade from the south and/or the chosen length of the light rejection period the lower faces of the prismatic ribs may have to receive a specific saw-tooth profile structure.

The solar radiation penetrating the window pane is distributed such that no uncomfortable glare will be experienced. A part of the penetrating radiation is directed to the ceiling of the room—usually white and diffusely reflecting—and cares for an improved daylight illumination—particularly in the deeper parts of the room.

DETAILED DESCRIPTION OF THE INVENTION

Figure 1:
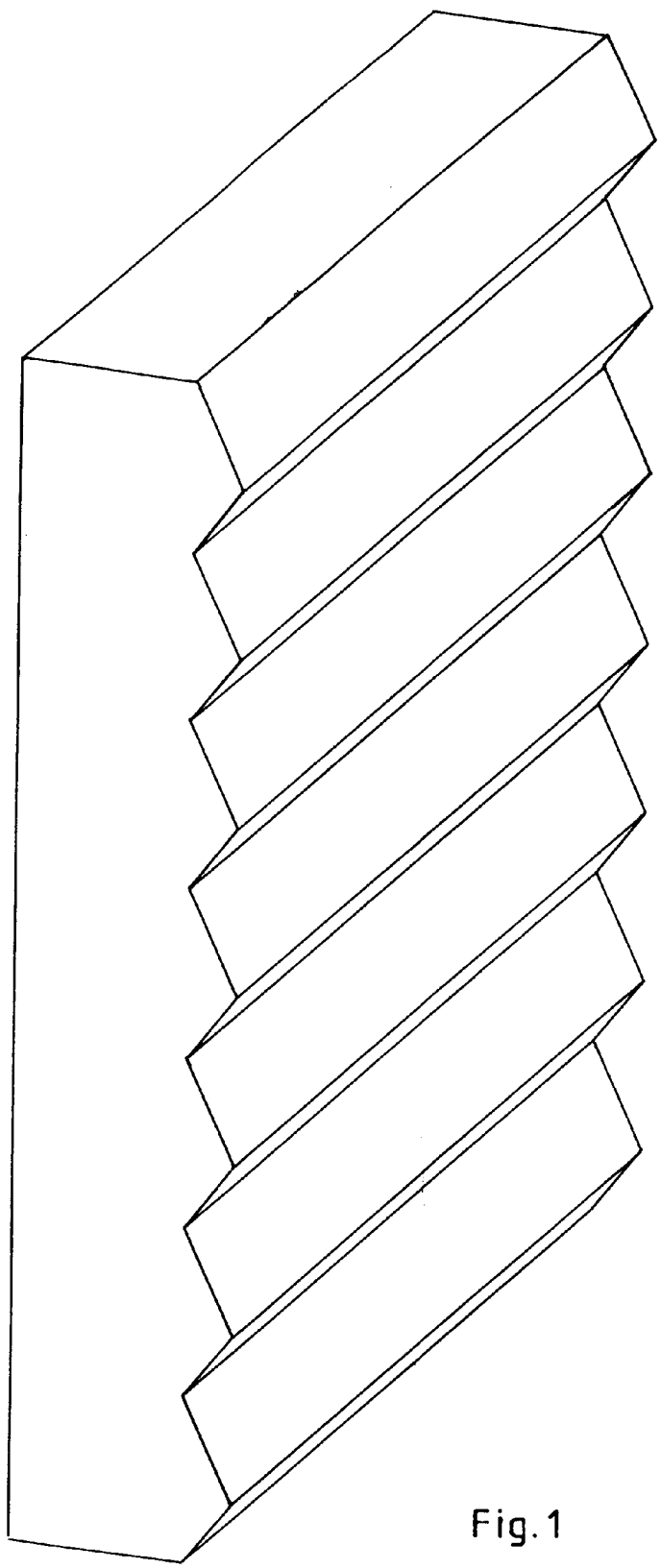
FIG. 1 is a perspective view of a typical pane with a prismatic structure of ribs and grooves.
Figure 2:
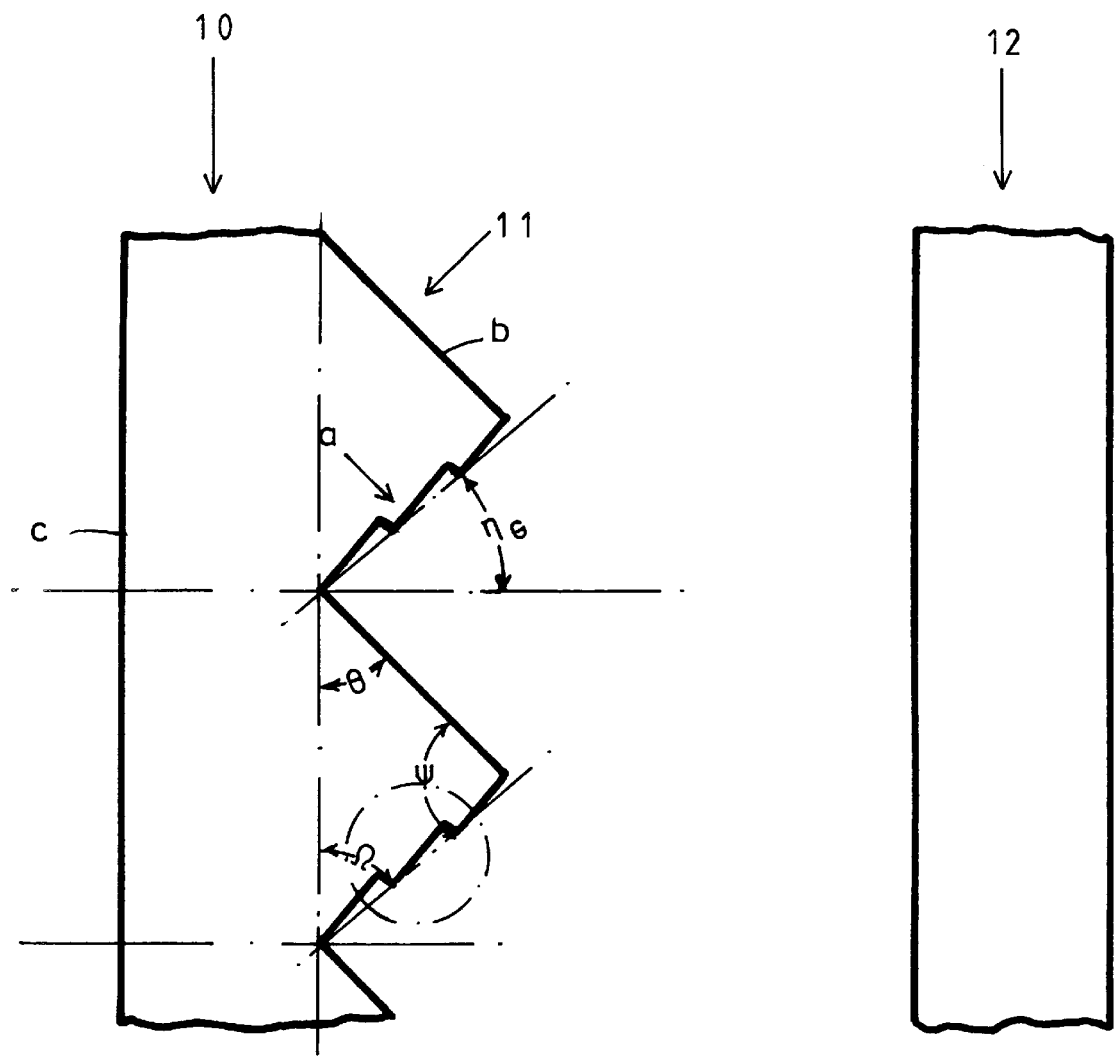
FIG. 2 is an enlarged vertical cross-section of the essential pane with a prismatic structure of ribs and grooves and a common plane pane of transparent material in front of it.

The objects of this invention are achieved by a pane of transparent material which has a plane, mainly vertical rear face—i.e. pointing to the facade of the building—and a plurality of parallel, identical ribs—and corresponding grooves between the ribs—of triangular cross-section on the front face (FIG. 1)—i.e. pointing away from the facade of the building—, the upper faces of the ribs being inclined to the facade plane by an angle $\theta$ which is determined by the equation $$\tan \theta = (1 - \sin \eta_G)/[(n^2 - 1)^{1/2} - \cos \eta_G],$$

where n is the refractive index of the pane material and $\eta_G$ is a limiting value of the angle $\eta$ which is the angle between the projection of the solar vector—this is the vector pointing to the sun—within the cross-sectional plane of the rib and the normal of the facade plane and the limiting property of the angle $\eta_G$ is to be understood such that solar rays impinging on the pane with an angle a $\eta > \eta_G$ are to be rejected and rays with an angle $\eta < \eta_G$ are to be transmitted, (Up to here the presented design principles are looked upon as state of the art, as the French patent application no. 8017364 describes a similar pane and an implicit equation for the angle which leads to the same values of as the explicit equation presented above.)

the longitudinal axis of the ribs generally being inclined by an angle a with reference to the horizontal line which is determined by the equation $$\alpha = -\arctan (\sin \beta/\tan \lambda),$$

where $\beta$ is the angle of the facade direction deviating from the south and $\lambda$ is the geographic latitude of the application site, the lower faces of the ribs being inclined to the facade plane by an angle $\Omega$ which is equal to or greater than the complement of the limiting angle $\eta_G$, and but only if $\sin (\eta_M - \theta) > n \cdot \sin (\eta_G - \theta)$, where $\eta_M$ is the maximum angle $\eta$ of a direct solar ray which may occur during a year, the lower faces of the ribs being designed such that a ray with an angle $\eta > \eta_G$ which has penetrated the upper face of a rib and is internally impinging on the lower face will not be reflected by the lower face in the direction of the rear face of the pane (FIG. 2).

The limiting angle $\eta_G$ determines the inclination angles of the upper and of the lower faces of the ribs and, hence, determines the seasons of the year, when the pane rejects or transmits direct solar radiation. Thus the desirable duration of the summer season—enclosing the summer solstice as a central point of time—, during which direct solar radiation is to be rejected by the pane, can be chosen by an adequate choice of the angle $\eta_G$. The limiting angle $\eta_G$ is determined by the equation $$\eta_G = \delta \cdot \cos (2\pi \cdot n_G/n_J) + \arcsin \{\cos [\arctan (\tan \beta/\sin \lambda)] \cdot \cos \lambda/\cos \alpha\},$$

where $\delta = 23.45°$ is the maximum solar declination angle, $2 \cdot n_G$ and is the duration of the season in days and $n_J = 365.25$ is the mean duration of a year in days.

Preferably the limiting angle $\eta_G$ will be chosen such that the duration of the season, during which direct solar radiation is completely rejected, will be about that of the annual operation period of room cooling systems—with an individual bandwidth of ±2 months. If the season, during which direct solar radiation is rejected, is to start at vernal equinox and is to end at autumnal equinox and the facade is directed to the south, the limiting angle $\eta_G$ is the complement of the geographic latitude $\lambda$.

Figure 3:
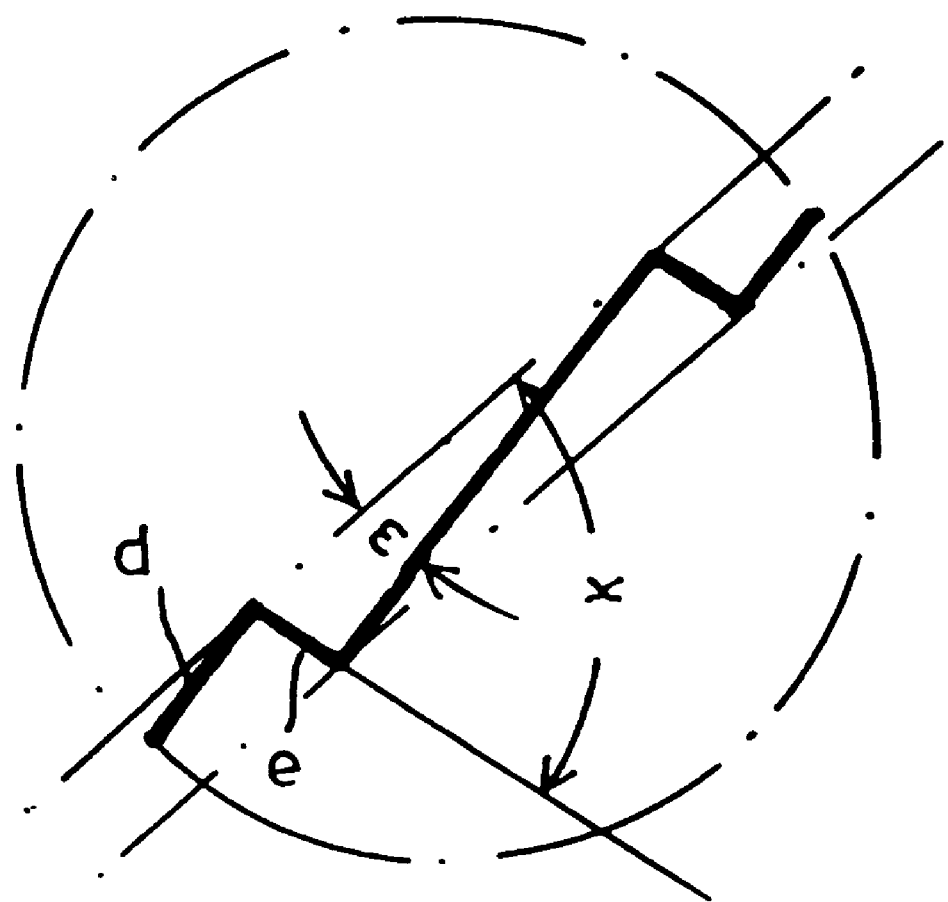
FIG. 3 is an enlarged part—the saw-tooth profile—of the essential pane shown in FIG. 2.

If solar rays intruding into the ribs at the upper faces and impinging internally on the lower faces are to penetrate—i.e. not to be internally reflected by—the lower faces of the ribs, the cross-section of the lower faces may be shaped like a saw-tooth profile (FIG. 3).

1. The angle $\epsilon$ of the saw-tooth profile is determined by the following requirement:

The direction of the flattest ($\eta = \eta_G$) direct solar ray of the light rejection period after being refracted by the prism face b and before impinging on the saw-tooth face e is to be equal to the direction of the steepest ($\eta = \eta_M$) direct solar ray after being refracted by the prism face b and totally reflected by saw-tooth face d and before impinging on the saw-tooth face e.

2. The angle $\kappa$ of the saw-tooth profile is determined by the following requirement:

The flattest ($\eta = \eta_M$) direct solar ray of the light rejection period after being refracted by the prism face b is to be refracted by the saw-tooth face e such that the refracted ray is parallel to or, respectively, moving away from the saw-tooth face d; this refracted ray is parallel to the refracted ray of the steepest ($\eta = \eta_M$) direct solar ray, if the angle $\epsilon$ has been dimensioned due to condition 1.

Thus the angles of the saw-tooth profile are determined by $$\epsilon = (\mu_G + \mu_M)/2 - \gamma_G$$

with $\gamma_G = \eta_G - \theta$, $\gamma_M = \eta_M - \theta$, $\mu_G = \arcsin (1/n \cdot \sin \gamma_G)$, $\mu_M = \arcsin (1/n \cdot \sin \gamma_M)$ and $$\kappa \geq \arctan [(\cos \epsilon - n \cdot \sin A)/(\sin \epsilon - n \cdot \cos A)]$$

with $A = \pi/2 + \gamma_G - \mu_G$.

Preferably the saw-tooth profile starts at the edge of the groove with a tip of the saw-tooth profile and ends at the tip of the prismatic rib with a groove of the saw-tooth profile.

Another design—very likely less effective but probably easier to manufacture—which may avoid internal reflection at the lower faces of the ribs is to provide these faces with a rough, sand-blasted surface.

An embodiment of the invention is presented in FIG. 2. The vertical section of the pane 10 has a plane, vertical rear side c—pointing to the facade of a building—and at the front side—pointing away from the facade—a structure consisting of a plurality of ribs 11 with identical, triangular cross-sections and corresponding grooves. Each rib 11 has an upper face b and a lower face a. A common plane pane 12 is positioned in front—pointing away from the facade—of the pane 10. The material of pane 10 is acrylic, whereas pane 12 is a glass pane.

The pane 10 is directed to the south—subsequently $\alpha=0°$ holds, i.e. the ribs and grooves of the prismatic structure are horizontal—and is dimensioned for a geographical latitude of $\lambda=50°$. The upper faces b of the ribs 11 are inclined to the rear face by an angle $\theta$, and the angle is chosen such that solar rays incident to the pane with an angle $\eta > \eta_G$ are rejected or, respectively, with an angle $\eta < \eta_G$ are transmitted. The limiting angle $\eta_G$ and the angle $\eta$ shown in FIG. 2 are dimensioned such that the incident direct solar rays are to be rejected from vernal to autumnal equinox, whereas they are to be partly transmitted during a two-month-period before vernal—decrasingly—and after autumnal—increasingly—equinox and to be transmitted to the highest possible extent during the remaining winter season. Correspondingly the limiting angle $\eta_G$ is 40° and the angle $\theta$ is about 45°.

The lower faces a of the ribs 11 are inclined to the rear face by an angle $\Omega$ which is equal to or greater than the complement of the limiting angle $\eta_G$. Correspondingly the angle $\Omega$ is about 50° and, hence, the angle $\psi$ between the two faces a and b is about 85°.

In the case of the actual embodiment of the invention the lower faces a of the ribs 11 exhibit a saw-tooth profile with the faces d and e. The face d is inclined to the lower face a of the rib by an angle $\epsilon$ of about 10° and the face e is inclined to the lower face a of the rib by an angle $\kappa$ of about 77° (FIG. 3).

Figure 4:
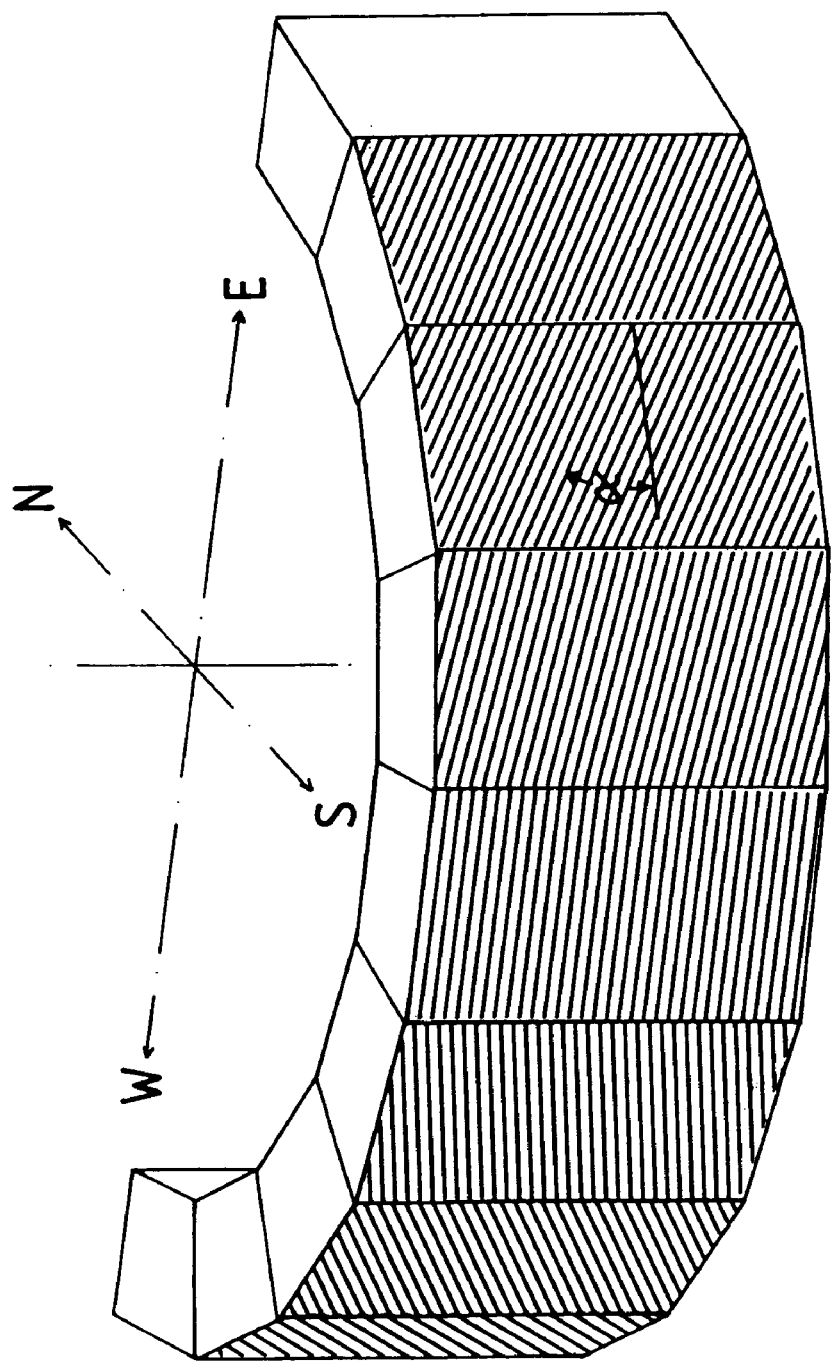
FIG. 4 is a perspective view of a building with facades pointing into different directions and equipped with panes corresponding to the present invention. For the sake of clarity the ribs and grooves of the panes are drawn in an exaggerated way in order to demonstrate the varying inclination of the ribs and grooves with reference to the horizontal line depending on the facade direction.

FIG. 4 presents an example, how the angle $\alpha$ of the ribs depends on the direction of the facade. As the properties of the pane remain essentially the same, if the actual direction of the pane deviates up to ±10° from the direction the pane was designed to, 7 types of the pane system and, correspondingly,—for symmetry reasons—4 types of the pane with different sets of the angles $\theta$, $\Omega$ and $\alpha$ are sufficient for the adequate equipment of a building, the facade directions of which are deviating by up ±70° from the south.

If a pane due to the present invention is applied at a site, the geographical latitude of which is differing from that of the site it was designed to, the duration of the season of direct solar radiation rejection is reduced by about 5 days per 1 degree increase of latitude and vice versa. I.e. the duration of direct solar radiation rejection of one existing pane is adapted in the right direction—and, moreover, as can be shown from detailed analysis, by a reasonable extent—to the colder or warmer climate of an application site not corresponding to the geographical latitude the pane was designed to. Panes due to the present invention, therefore, are insensitive to the geographical latitude of the actual application site.

The refractive indices of transparent materials as common window glass and acrylic, for instance, are about n=1.5 and those of polycarbonate and polystyrene are about n=1.59. With sufficient accuracy the refractive index of air can be set to n=1.

From a design point of view the prismatic ribs usually will be integral parts of the pane. However, it is likewise possible to put the pane together from a plurality of separate, identical prismatic bars. The cross-section of such a bar consists of a parallelogram—particularly a rectangle—and a triangle—i.e. the cross-section of the rib—with a common base.

On principle the pane corresponding to the present invention can be applied without protecting panes. For cleaning and thermal isolating reasons, however, the pane should be used in a system with one plane pane in front of it or as a pane in the middle between two plane panes.

In both directions—i.e. as well from the inside to the outside as from the outside to the inside—the pane prohibits a clear view. It may be adequately combined, however, with common panes, if a partially clear view is desired. The pane renders not only external protection systems against solar irradiation unnecessary but enables also the waiver of internal systems prohibiting insight from the outside.

In summer the pane completely rejects the incident direct solar radiation and avoids as well the heating and glaring effect of this radiation as excessive brightness in the rooms and, hence, reduces the energy consumption for cooling purposes. In winter the direct solar radiation is essentially transmitted by the pane and, thus, contributes to the energy which has to be supplied for room heating.

Figure 5:
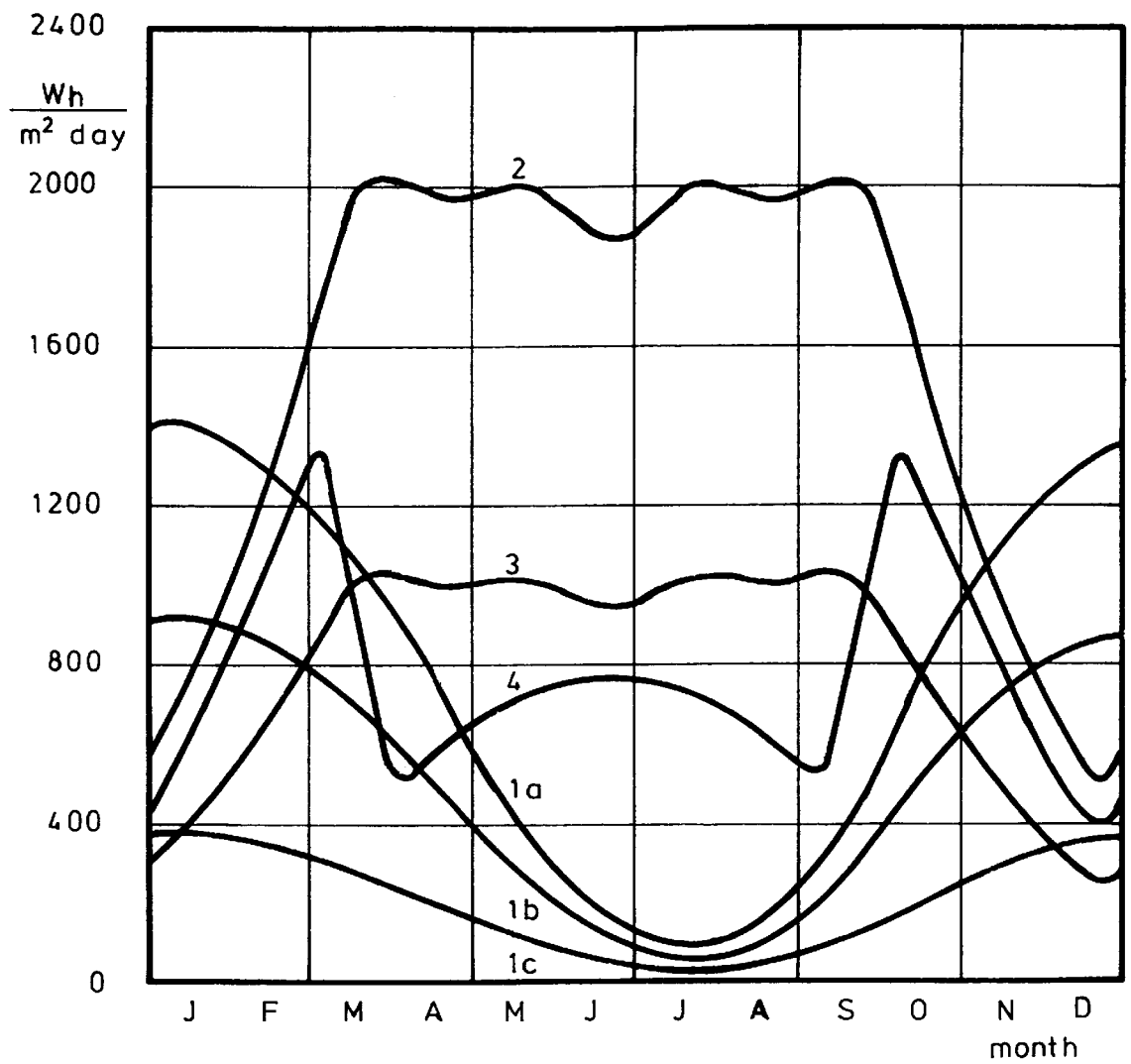
FIG. 5 is a diagram presenting the heat losses and heat gains of different pane systems in dependence on the month of the year.

For the atmospheric conditions of a big city and a geographical latitude of 50° FIG. 5 presents the heat losses and heat gains of different pane systems depending on the time of the year. The curves 1a, 1b and 1c present the mean daily heat losses of pane sytems with thermal transport coefficients of 3 W/m²K (1a: a common double-pane glazing or, respectively, a double-pane system due to the present invention), 2 W/m²K (1b: a common solar protection double-pane system) and, respectively, 0.8 W/m²K (1c: a double-pane system due to the present invention combined with a transparent insulation). The curves 2, 3 and 4 present the mean daily heat gains from diffuse and direct solar irradiation into a common double-pane glazing (2), a common solar protection double-pane system (3: solar energy transmittance=0.41) and, respectively, a double-pane system due to the present invention (4), each being directed to the south.

Figure 6:
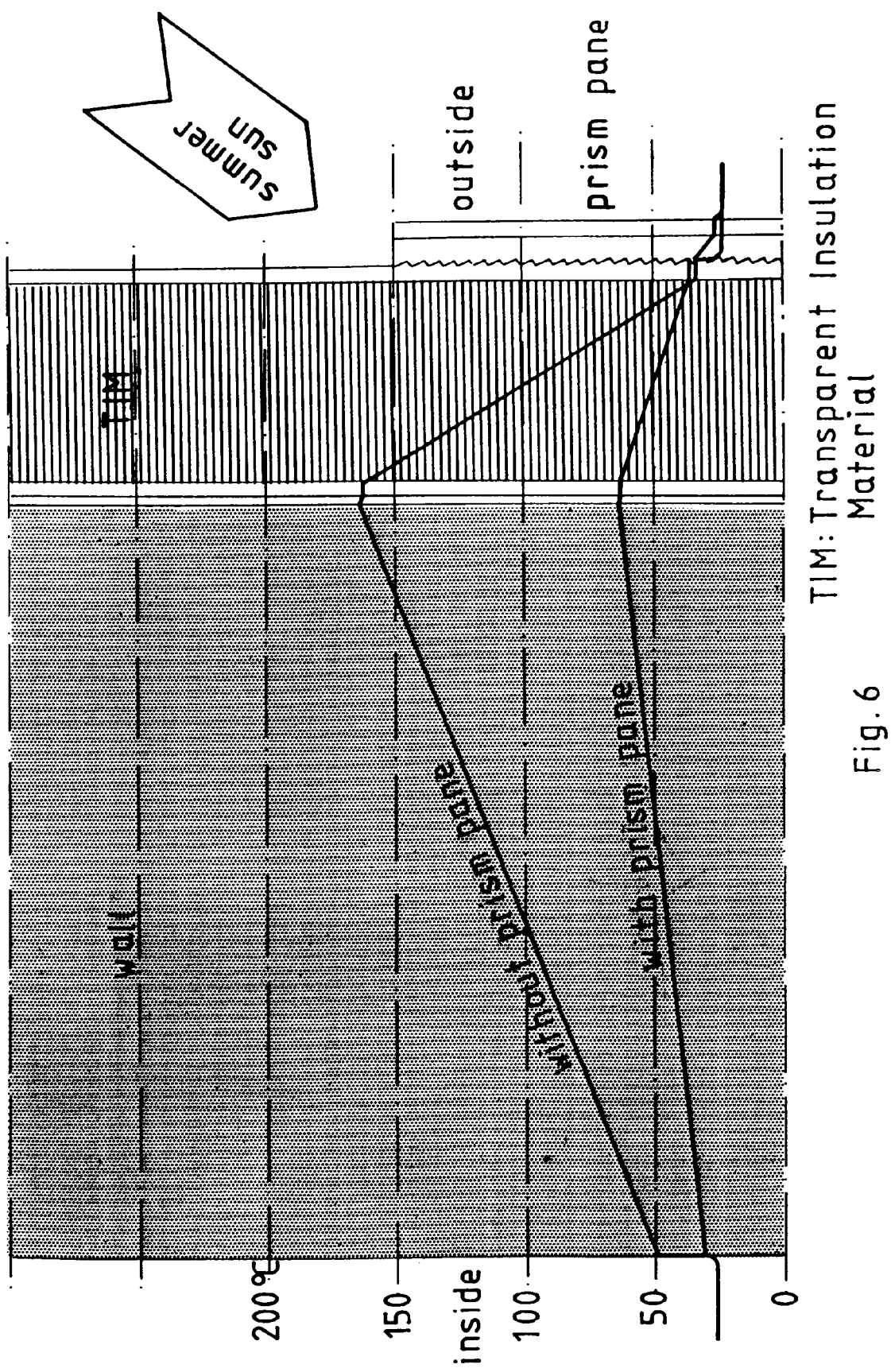
FIG. 6 shows a plot of the temperature across a wall with a transparent insulation irradiated by the summer sun. Another temperature plot shows that the temperature level is substantially reduced, if a pane due the present invention is added.

The pane is able to replace venetian blinds or other movable protection systems and may avoid overheating of facade walls equipped with transparent insulation (FIG. 6).

Rays from diffuse solar radiation, of course, experience for the same incident angles the same transmittance or rejection as rays from direct solar radiation. All over the year a substantial part of diffuse solar radiation, however, is incident to the pane with angles less than $\eta_G$. This explains that the pane is essentially penetrable to diffuse solar radiation.

Figure 7:
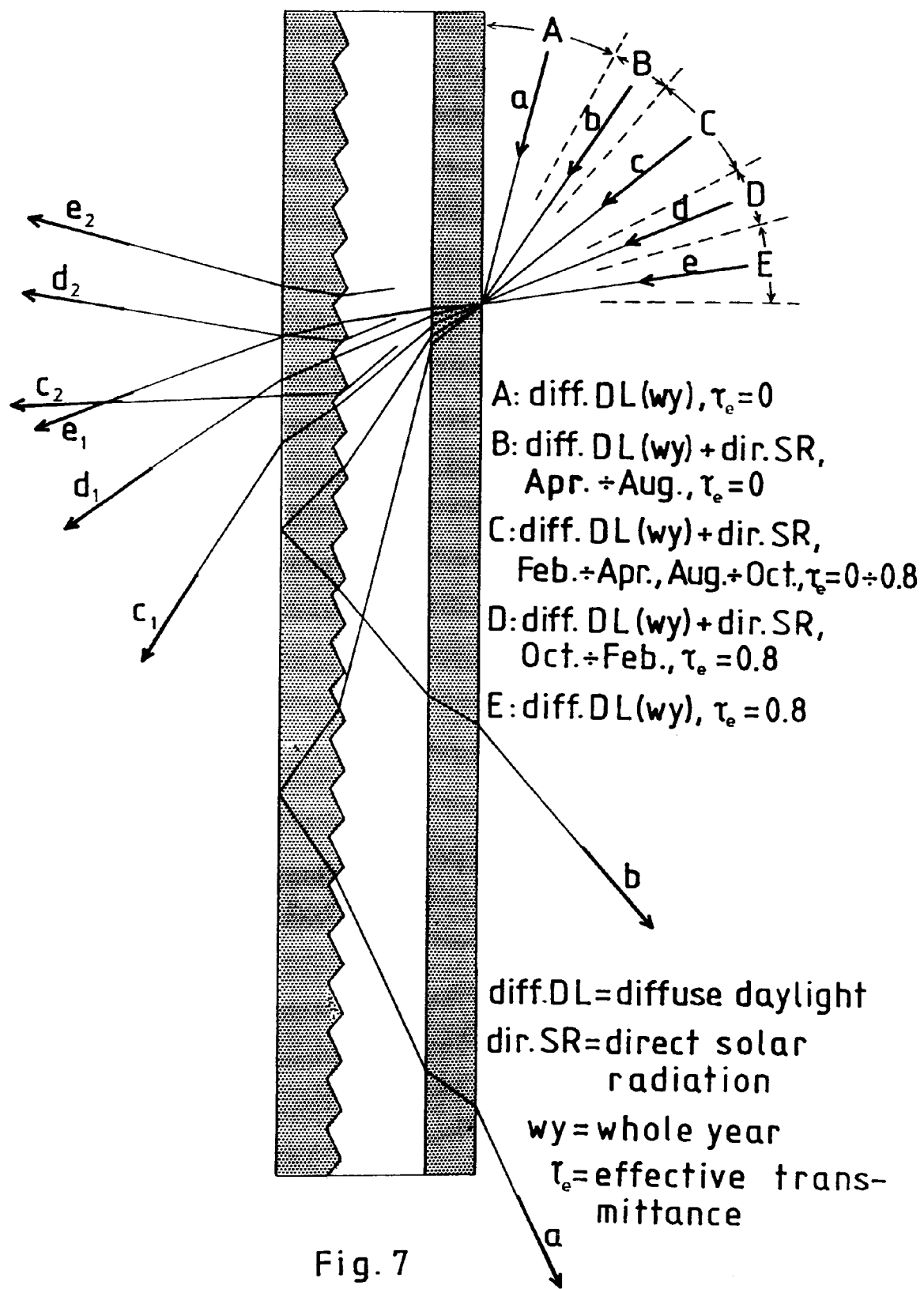
FIG. 7 presents a cross-section of a pane system corresponding to the present invention with the traces of rays of different altitude angles within the cross-sectional plane which occur at the indicated time periods of the year.
Figure 8:
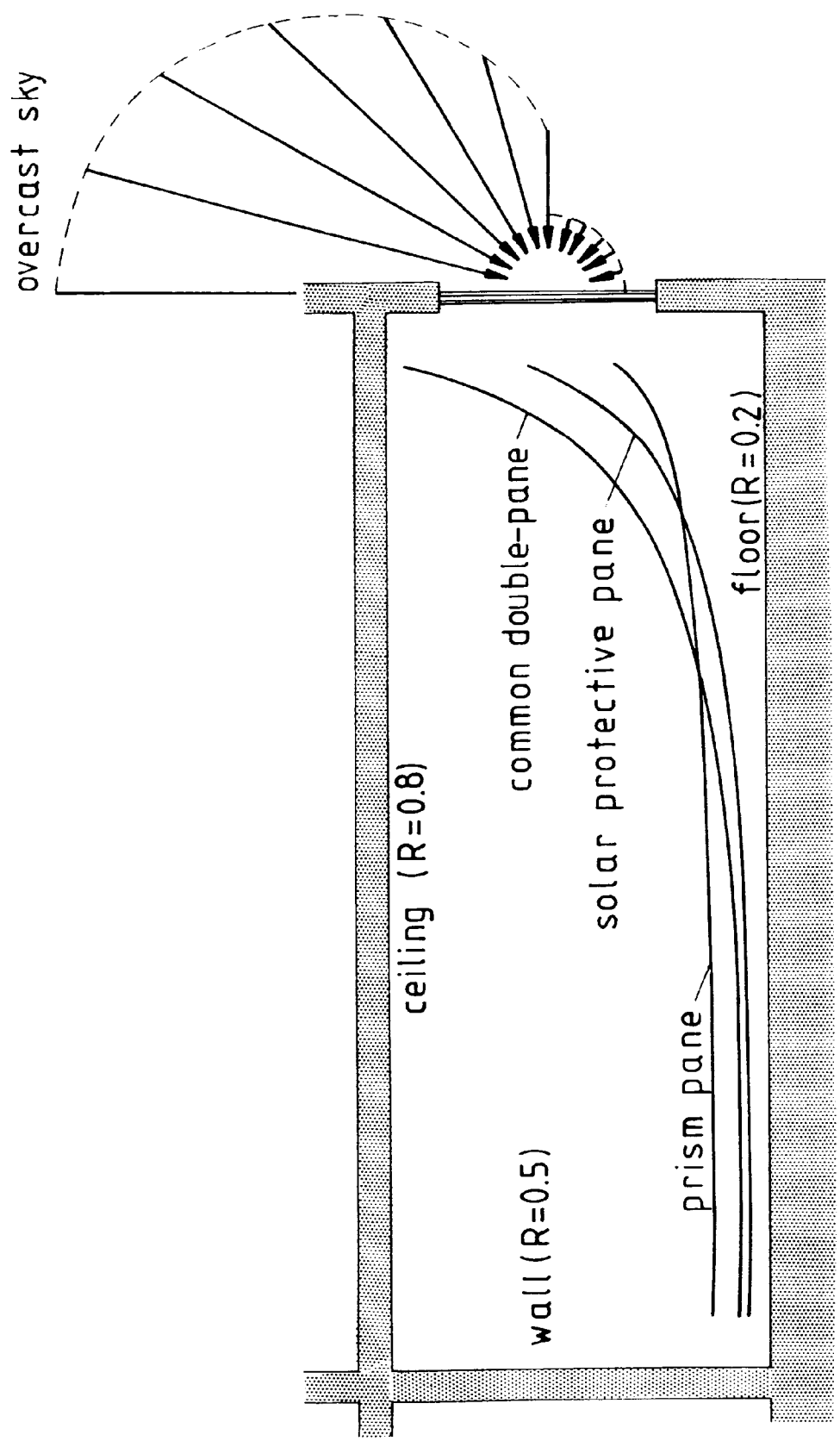
FIG. 8 presents the daylight factor versus the depth of a room due to diffuse solar radiation from an overcast sky transmitted into the room by different window panes.

Diffuse solar radiation from an overcast sky presents the worst external condition for the illumination of rooms by daylight. I.e. this condition has to be taken into account for the design of the illumination of rooms by daylight. In comparison to a common pane the pane due to the present invention during all seasons of the year transmits a reduced part of the impinging diffuse solar radiation; about 62% of the energy of diffuse solar radiation from an overcast sky which would be transmitted by a common pane on identical conditions, for instance. However, as a part of the transmitted diffuse solar radiation is horizontally or slightly upward directed by the pane into the deeper parts and against the—usually white and diffusely reflecting—ceiling of a room (FIG. 7), the daylight illumination of rooms usually is improved, if common window panes are replaced by window panes due to the present invention (FIG. 8).

The known techniques for the improvement of the thermal resistance of pane systems, as e.g. the filling of the space between the panes with gas reducing the thermal convection and conduction and the evaporation of thin layers on the pane surfaces, can be additionally applied without affecting the specific properties of the pane system due to the present invention.

I claim:

1. A pane of transparent material which has a plane, vertical rear face pointing to the facade of the building and a plurality of parallel, identical ribs of triangular cross-section on the front face pointing away from the facade of the building, the upper faces of the ribs being inclined to the facade plane by an angle $\theta$ which is determined by the equation $$\tan \theta = (1-\sin \eta_G)/[(n^2-1)^{1/2} - \cos \eta_G],$$

where n is the refractive index of the pane material and $\eta_G$ is a limiting value of the angle $\eta$ which is the angle between the projection of the solar vector pointing to the sun within the cross-sectional plane of the rib and the normal of the facade plane and the limiting property of the angle $\eta_G$ is to be understood such that solar rays impinging on the pane with an angle $\eta > \eta_G$ are to be rejected and rays with an angle $\eta < \eta_G$ are to be transmitted, wherein the improvement comprises:

the longitudinal axis of said rib is inclined by an angle $\alpha$ with reference to the horizontal line which is determined by the equation $$\alpha = -\arctan (\sin \beta/\tan \lambda),$$

where $\beta$ is the angle of the facade direction deviating from the south and
$\lambda$ is the geographic latitude of the application site.

2. The pane of claim 1 wherein:
said lower faces of the ribs are inclined to the facade plane by an angle $\Omega$ which is equal to or greater than the complement of the limiting angle $\eta_G$.

3. The pane of claim 2 for an application, for which $$\sin (\eta_M - \theta) > n \cdot \sin (\eta_G - \theta)$$

holds, where $\eta_M$ is the maximum angle $\eta$ of a direct solar ray which may occur during a year, wherein:
said lower faces of the ribs are shaped like a saw-tooth profile, the angles of which are determined by $$\epsilon = (\mu_G + \mu_M)/2 - \gamma_G$$

with $\gamma_G = \eta_G - \theta$,
$\gamma_M = \eta_M - \theta$,
$\mu_G = \arcsin (1/n \cdot \sin \gamma_G)$,
$\mu_M = \arcsin (1/n \cdot \sin \gamma_M)$ and $$\kappa \geq \arctan [(\cos \epsilon - n \cdot \sin A)/(\sin \epsilon - n \cdot \cos A)]$$

with $A = \pi/2 + \gamma_G - \mu_G$.

4. The pane of claim 2 for an application, for which $$\sin (\eta_M - \theta) > n \cdot \sin (\eta_G - \theta)$$

holds, wherein:
said lower faces of the ribs are provided with a rough sand-blasted surface.

5. The pane of claim 1 wherein:
the duration of the summer season; enclosing the summer solstice as a central point of time, during which direct solar radiation is rejected by said pane, is determined by sizing the limiting angle $\eta_G$ due to the equation $$\eta_G = \delta \cdot \cos (2\pi \cdot n_G/n_J) + \arcsin [\cos [\arctan (\tan \beta/\sin \lambda)] \cdot \cos \lambda/\cos \alpha],$$

where $\delta = 23.45°$ is the maximum solar declination angle,
$2 \cdot n_G$ and is the duration of the season in days and
$n_J = 365.25$ is the mean duration of a year in days.

6. The pane of claim 5 wherein:
the limiting angle $\eta_G$ is determined such that the duration of the season, during which direct solar radiation is completely rejected, will be about that of the annual operation period of room cooling systems, with an individual bandwidth of ±2 months.

* * * * *